April 20, 1926.

N. H. FOOKS

COMBINED COOKER AND COOLER

Filed March 3, 1925

1,581,532

Inventor

Nelson H. Fooks.

Attorneys

Patented Apr. 20, 1926.

1,581,532

UNITED STATES PATENT OFFICE.

NELSON H. FOOKS, OF PRESTON, MARYLAND.

COMBINED COOKER AND COOLER.

Application filed March 3, 1925. Serial No. 12,963.

*To all whom it may concern:*

Be it known that I, NELSON H. FOOKS, a citizen of the United States, residing at Preston, in the county of Caroline and State of Maryland, have invented certain new and useful Improvements in Combined Cookers and Coolers; and I do hereby declare the following to be a full, clear, and exact description of the invention, such as will enable others skilled in the art to which it appertains to make and use the same.

This invention relates to improvements in apparatus for heat treating substances such as food products contained in sealed receptacles, such as tin cans, and has for its object to provide an apparatus which will permit the cans to be transferred from a cooking medium to a cooling medium in a very expeditious manner.

Generally stated, the apparatus comprises a cooker having a helical can path along which the cans are adapted to be moved in a cooking medium by suitable means, and a cooling tank below the cooker, having an endless conveyer for conveying the cans through the cooling medium in the tank after they are discharged from the cooker. The invention is primarily concerned with the novel means for transferring the cans from the helical can path to the endless conveyer in the cooling tank, and includes a chute or can-guiding means leading from the can-discharge end of the helical can path to a rotary member having can-receiving pockets in which the cans are receivable, the said endless conveyer and rotary member being so arranged that the cans received by the rotary member from the can chute may be deposited by the rotary member on the endless member to be carried away by the latter to a point of discharge into the atmosphere.

It may be advantageous to mention that the present invention is concerned with an apparatus for effecting the process set forth in my Patents Nos. 1,491,092 and 1,491,093, granted April 22, 1924, and for similar processes.

Referring to the drawings.

Figure 1:
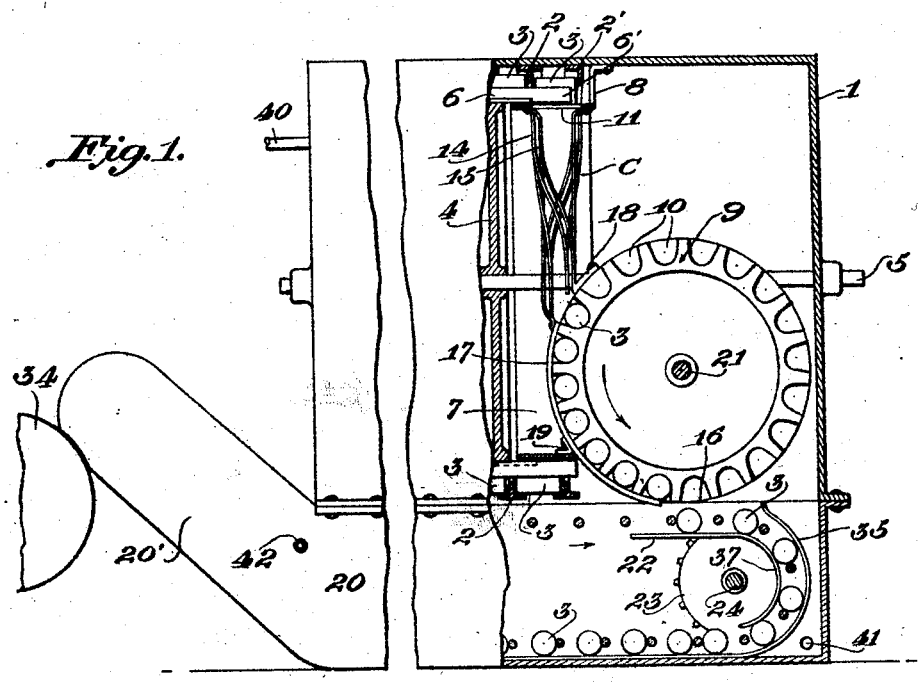
Fig. 1 is a view partly in side elevation, partly in section, showing the improved apparatus.

In the drawings, 1 indicates a shell or container shown as circular in cross-section, and arranged within this shell is a helical can path preferably formed by T-irons 2 which are secured to the inner periphery of the shell in any suitable manner, the two irons together constituting a track or guideway for the cans, indicated at 3. Cooperating with the helical can path formed by the rails is a reel 4 affixed on a shaft 5 which extends longitudinally through the tank. This reel includes a plurality of angle irons 6 which are arranged parallel to the shaft 5, the cans 3 being moved along the helical can path by the reel as the latter rotates, as will be readily understood, this construction being well-known in the art and clearly illustrated in various patents, as, for example, in my Patent No. 1,318,985, patented October 14, 1919.

Concentrically arranged with respect to the reel 4 is an annular ring 7 which is supported in non-turnable and fixed position in any suitable manner, as by means of brackets 8 secured to the shell 1 to the ring. The angle irons 6 on the reel are extended over the ring 7, one web of the angle iron being cut away so as to leave only the radial web 6', these radially extending webs constituting the side walls of the trough in which the cans 3 are held in position on the reel while they are being moved along the helical can path by the reel, as will be readily understood. When the cans have reached the end of the helical can path, which is shown as near the top of the tank, they pass into a can guide or chute C for passage to a rotary member 9 having pockets 10 in its periphery for receiving cans. The top of the ring 7 is provided with a cutout 11 through which the cans may pass to the can guide or chute C. It will now be seen that the ring 7 forms a circular platform on which the cans rest while in the last convolution of the helical can path, and that as the end of the can path has been reached the cans pass through the opening 11 in the ring and into the chute C for guidance to the rotary member 9. Part of the helical can path at the top of Fig. 1, where the cans pass through the opening 11 in the ring, is shown as an angle iron 2', it being obvious that it is not necessary to provide a T-iron at this point.

The rotary member 9 is arranged in a vertical plane within the tank 1 and is mounted on a shaft 12 which is supported in suitable bearing standards 13 secured to the bottom of the tank. The chute C is shown as made up of a plurality of rods, two such rods 14, 15 being provided for each corner edge of the can to be guided, there being eight rods in all. The chute is arranged with a twist so that the cans in passing down the chute will be swung through 90° in a horizontal plane and will be received in pockets 10 of the rotary member with their axes parallel to that of the said rotary member, it being remembered that the cans while being moved along the helical can path have their axes parallel to the axis of the reel.

The rotary member 9 is preferably entirely contained within the tank or container 1, the lower part of the rotary member being disposed very close to the bottom of the tank which has an opening 16 through which the cans may be discharged from said rotary member onto a member hereinafter to be described. Cooperating with the rotary member 9 is an arcuate guide 17 for holding the cans in the pockets 10 on the rotary member, as they are received from the chute C, this guide extending to the opening 16 in the bottom of the tank. It will now be seen that the chute C formed by the plurality of rods 14 and 15 extends from the opening 11 in the ring 7 directly to the pockets of the rotary member 9. 18 indicates the support to which the lower terminals of the chute rods may be secured, the opposite and lower terminals of the rods being secured to the casing or guide member 17. The guide member 17 is supported in any suitable manner, as, for example, by being anchored to the ring 7 in any suitable manner, as by a bracket 19.

Arranged below the shell or container 1 is a tank 20 adapted to contain a cooling liquid. In this cooling tank is arranged an endless conveyer 21 constructed in such a manner that the cans 3 discharged from the pockets 10 of the rotary member 9 may be received between the hinges thereof. For supporting the cans on the upper run of the conveyer, there is provided a suitable platform 22, which, in the present instance, is shown of a length to extend completely below and somewhat beyond the opening 16 in the bottom of the shell or container 1. The endless chain passes over a suitable sprocket wheel 23 affixed on a shaft 24 which is adapted to be driven in a given timely relation with the respect to the rotary member 9, as by means of a link belt 25 passing over a sprocket wheel 26 on the shaft 24, and over the sprocket wheel 27 on the shaft 12 on which the rotary member is mounted. The rotary member is shown as driven by the shaft 5 through a worm 28 meshing with a worm wheel 29 affixed on a shaft 20, the lower end of the shaft being provided with a bevel gear 31 which meshes with a bevel gear 32 affixed on the shaft 12. The shaft 12 passes through the side wall of the tank through a suitable fluid-tight bearing 33. It is to be understood, however, that the invention is not limited to this particular form of driving arrangement for the rotary member 9 and the endless conveyer 22, inasmuch as any suitable driving mechanism may be provided which will insure the necessary timely relation between the endless conveyer and the rotary member and between the rotary member and the rate of discharge of cans through the opening 11 in the ring 7.

Figure 2:
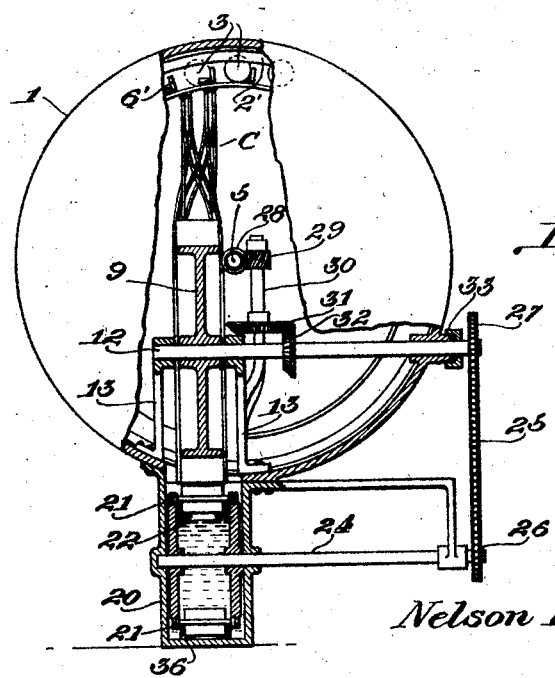
Fig. 2 is an end view of the apparatus shown in Fig. 1, mostly in vertical section.
Figure 2:

As the cans are discharged from the pockets 10 of the rotary member through the opening 16 in the bottom of the tank, they are received by and carried along by the endless conveyer along the bottom of the tank and up an inclined end 20 of the cooling tank, and discharged through a suitable rotary valve generally indicated at 34. For guiding the cans around the loop at the sprocket wheel 23 there is provided a suitable arcuate guide 35 which is conveniently extended as a bottom track 36 in the form of angle irons on which the cans may rest while being carried along the bottom of the tank up to the point of discharge in the rotary valve 34. The platform 22 which supports the cans in place in the conveyer below the opening 16 in the tank is extended as an arcuate member 37 to form with the arcuate guide 35 a channel for the cans in passing around the loop. For convenience of illustration the detailed structure of the endless conveyer has not been illustrated in Fig. 1 and only partially illustrated in Fig. 2.

The cooling tank 20 is attached to the bottom of the tank in a manner to form a fluid-tight connection.

As already indicated, the cooling tank is adapted to contain a suitable cooling liquid, such as water, so that the cans on leaving the container or shell 1 which constitutes the cooker shell, may be cooled before being discharged into the atmosphere. The heating medium for cooking the contents of the cans while the cans are being moved along the helical path may be steam or any other suitable heating medium. Inasmuch as there is direct open communication between the bottom of the shell 1 and the top of the cooling tank, the heating medium will obviously overlie the cooling medium. The heating medium is supplied to the cooker proper in any suitable manner, as through a conduit 40, and cooling water is supplied to the cooling tank through a suitable conduit 41. The level of the cooling medium will preferably be maintained at about the level of the supporting platform 22, an overflow or waste pipe 42 being provided in the cooling tank for keeping the cooling medium at that level.

The apparatus while primarily adapted in connection with pressure cooking and cooling is equally well adapted to so-called open-air methods of cooking and cooling.

It will now be seen that I have provided a very compact and relatively simple apparatus for enabling cooking and cooling to be effected as a single continuous operation. By arranging the cooling tank longitudinally of the cooker shell below the same, the floor space required for the cooking and cooling of the cans is reduced to a minimum. It will further be seen that the cooling tank and apparatus contained therein and associated therewith can be built as a unit and readily attached to the cooker which may also be built as a unit.

It is obvious that various constructional features may be varied without departing from the spirit of the invention, and consequently no limitations are intended except as may be defined in the appened claims.

What I claim is:

1. In combination with a longitudinally extending helical can path having a point of discharge for cans in its upper side, means for moving the cans along said path, a rotary member having can-receiving pockets in its periphery and arranged to rotate in a vertical plane, means for conducting cans from the point of discharge in said can path to the pockets in said rotary member, and a shell within which said can path and rotary member are contained, said shell having an opening in its bottom through which cans may be discharged from the pockets of the rotary member.

2. In combination with a longitudinally extending helical can path having a point of discharge for cans in its upper side, means for moving the cans along said path, a rotary member having can-receiving pockets in its periphery and arranged to rotate in a vertical plane, means for guiding the cans from said point of discharge to the said pockets, a container within which all of the aforesaid parts are housed and an opening in the bottom of the container through which the cans may be discharged from the rotary member, an endless conveyer arranged adjacent the bottom periphery of the rotary member and adapted to receive the cans discharged by the pockets of the latter.

3. In combination, a shell having a helically arranged can path, and means for moving cans from one end to the other of said path, a rotary member having can-receiving pockets in its periphery, said rotary member arranged to receive cans from the helical path, an endless conveyer having a portion of its length disposed tangentially with respect to the rotary member whereby cans received in the pockets of said rotary member may be received on the endless conveyer and carried away and means coordinating the movement of the can propelling means, the rotary member and the conveyer.

4. In combination, a shell having a helically arranged can path therein, means for moving cans from one end of the path to the other, a rotary member within the shell having can-receiving pockets in its periphery, said rotary member being turnable in a vertical plane, one end of the helical path terminating in a chute leading to the said rotary member, said chute being provided with a twist for changing the axis of the cans discharged from the can path to a position parallel with the axis of the rotary member, and said shell having an opening through which cans may be discharged from said rotary member.

5. In combination, a shell having a helically arranged can path therein, means for moving cans from one end of the path to the other, a rotary member within the shell having can-receiving pockets in its periphery, said rotary member being turnable in a vertical plane, means connected with one end of said can path for leading cans therefrom to the pockets of the rotary member, said shell having an opening through which cans may be discharged from said rotary member, and an endless conveyer having a portion of its length tangentially arranged with respect to said rotary member and adapted to receive the cans as they are discharged from the rotary member.

6. In combination, a shell having a helically arranged can path therein, means for moving cans from one end of the path to the other, a rotary member within the shell having can-receiving pockets in its periphery, said rotary member being turnable in a vertical plane, one end of the helical path terminating in a chute leading to the said rotary member, said chute being provided with a twist for changing the axis of the cans discharged from the can path in a direction parallel with the axis of the rotary member, said shell having an opening through which cans may be discharged from said rotary member, and an endless conveyer having a portion of its length tangentially arranged with respect to said rotary member and adapted to receive the cans as they are discharged from the rotary member.

7. In combination, a shell having a helically arranged can path therein, means for moving cans from one end of the path to the other, a rotary member within the shell having can-receiving pockets in its periphery, said rotary member being turnable in a vertical plane, means connected with one end of said can path for leading cans therefrom to the pockets, said shell having an opening through which cans may be discharged from said rotary member, a tank arranged below the opening in said shell adapted to contain cooling liquid, and an endless conveyer arranged in said tank and adapted to receive the cans as they are discharged from the rotary member.

8. In combination, a shell having a helically arranged can path therein, means for moving cans from one end of the path to the other, a rotary member within the shell having can-receiving pockets in its periphery, said rotary member being turnable in a vertical plane, one end of the helical path terminating in a chute leading to the said rotary member, said chute being provided with a twist for changing the axis of the cans discharged from the can path to a position parallel with the axis of the rotary member, said shell having an opening through which cans may be discharged from said rotary member, a tank arranged below the opening in said shell adapted to contain cooling liquid, and an endless conveyer arranged in said tank and adapted to receive the cans as they are discharged from the rotary member.

9. In combination, a cooker having a helically arranged can path, means for moving the cans from one end of said path to the other, one end of said can path terminating in a can-discharging chute provided with a twist whereby when the cans are discharged from said chute the axis of each can so discharged will be at right angles to that of the axis of the helical can path, a rotary member having can-receiving pockets in its periphery, said cans upon discharge from the chute being received in said pockets, and a traveling member on which cans discharged by the rotary member are adapted to be deposited.

10. In combination, a helical can path, means for moving cans from one end of the path to the other, means for removing the cans from said can path comprising a chute leading from one terminal of the can path, a rotary member having can-receiving pockets in its periphery, said chute discharging the cans received therein into the pockets of said rotary member, a shell in which all of the aforementioned parts are mounted, said shell having a discharge opening through which cans may be discharged from the rotary member, a tank disposed longitudinally of the shell and below the same, an endless conveyer arranged within said tank and having a portion of its length disposed tangentially to the periphery of said rotary member, said conveyer adapted to receive and convey through said tank the cans which are discharged by said rotary member.

11. In combination, a helical can path, rotary means for moving the cans along said path, said means including radially extending webs between which the cans to be moved are confined, a flat ring arranged adjacent the terminal end of the helical can path and inwardly of the same, the radially extending webs of the rotary member extending over the ring, said ring having an opening in its upper portion through which cans may pass from the terminal end of the helical can path, and a chute leading from said opening.

12. In combination, a helical can path, rotary means for moving the cans along said path, said means including radially extending webs between which the cans to be moved are confined, a flat ring arranged adjacent the terminal end of the helical can path and inwardly of the same, the radially extending webs of the rotary member extending over the ring, said ring having an opening in its upper portion through which cans may pass from the terminal end of the helical can path, a chute leading from said opening, a rotary member arranged in a vertical plane and having can-receiving pockets in its periphery, said chute having its discharge end located to discharge the cans into the pockets of the rotary member and having a twist for turning the cans in a horizontal plane.

In testimony whereof I affix my signature.

NELSON H. FOOKS.